United States Patent [19]
Travaglio

[11] 3,741,476
[45] June 26, 1973

[54] PNEUMATIC THERMOSTAT
[75] Inventor: Dainy Travaglio, Kensington, Calif.
[73] Assignee: Universal Pneumatic Controls, Inc., Belmont, Calif.
[22] Filed: Jan. 13, 1972
[21] Appl. No.: 217,570

[52] U.S. Cl. .................. 236/87, 73/1 F, 236/94
[51] Int. Cl. ............................................. F24f 7/06
[58] Field of Search .................. 236/94, 87; 73/1F; 337/94, 347

[56] References Cited
UNITED STATES PATENTS

| | | | |
|---|---|---|---|
| 2,511,340 | 6/1950 | Joesting | 236/87 |
| 2,427,946 | 9/1947 | Blosser et al. | 337/347 |
| 3,452,928 | 7/1969 | Stark | 236/87 |
| 2,762,885 | 9/1956 | Foster | 337/94 |

Primary Examiner—William E. Wayner
Assistant Examiner—William E. Tapolcai, Jr.
Attorney—Roger W. Erickson

[57] ABSTRACT

A pneumatic thermostat for air conditioning and heating systems utilizes an adjustable hinged arm with a bimetal member that is positionable by a cam for controlling air flow through a bleed orifice. Air to the orifice from a pressure source is also supplied to a calibration chamber in the thermostat so that the resulting pressure therein will control the position of an indicator pin that becomes visible from outside the thermostat at certain pressure levels. Means are provided for adjusting the position of the hinged arm without opening the thermostat so as to control the amount of air flow through the bleed orifice and hence the pressure in the calibration chamber. Proper calibration is attained by setting the cam relative to a known temperature level and adjusting the arm position by visual reference to the position of the indicator pin.

14 Claims, 6 Drawing Figures

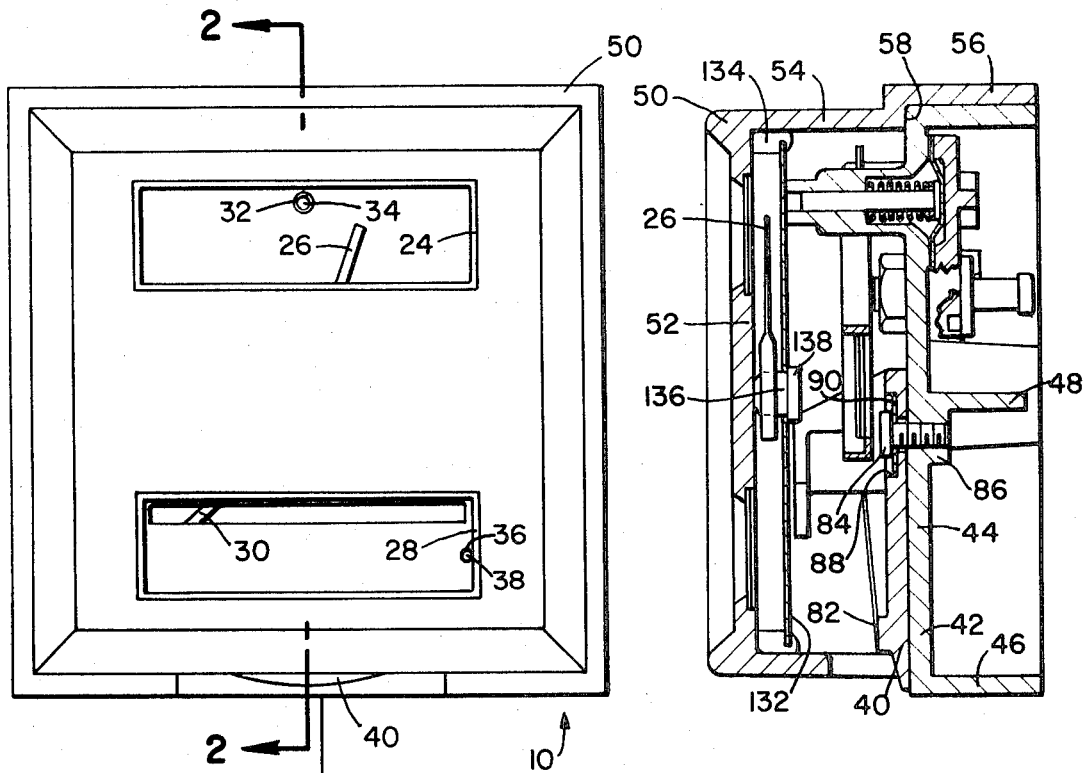
FIG _ 2
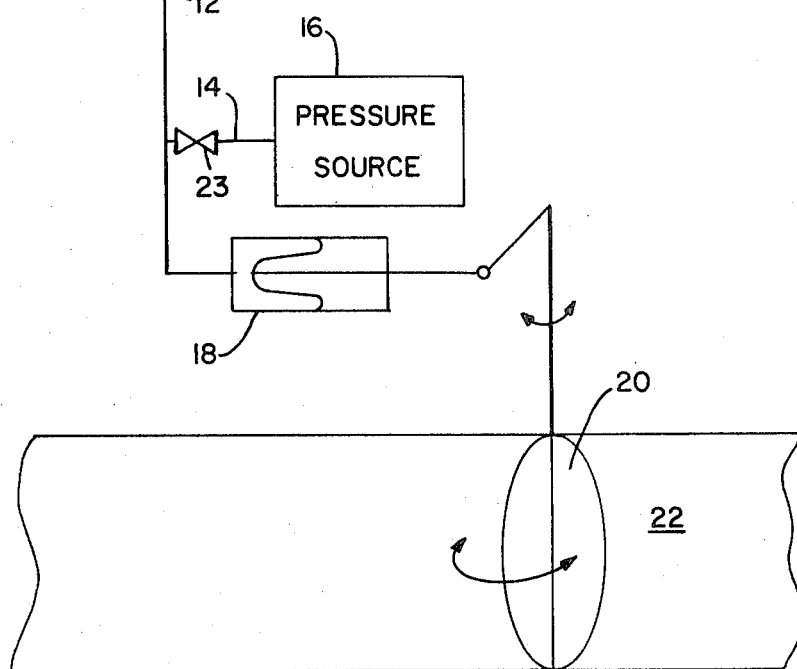
FIG _ 1

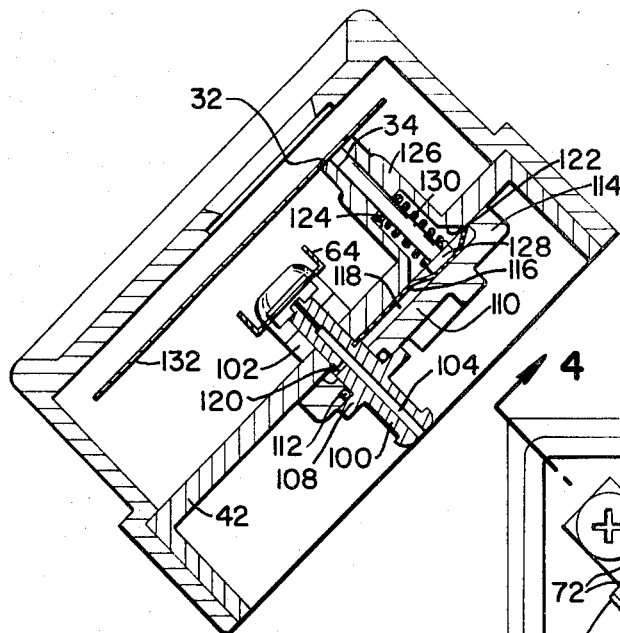
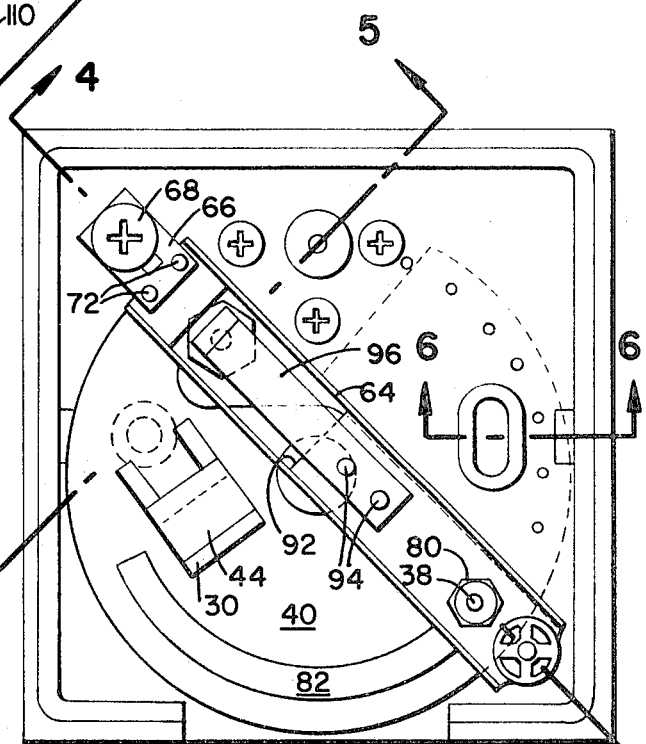
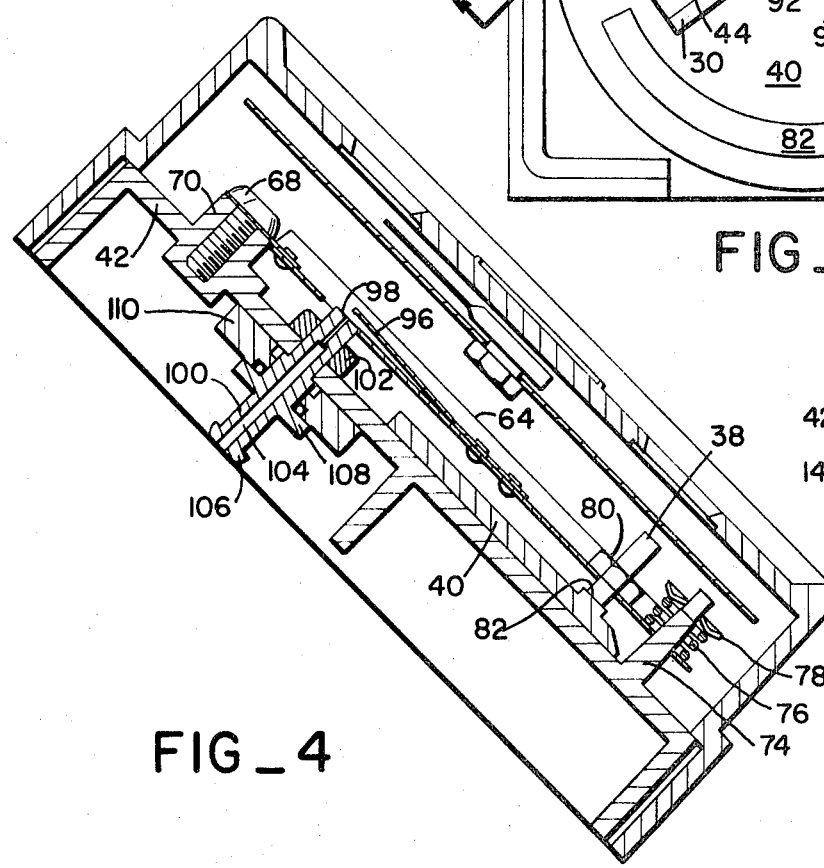
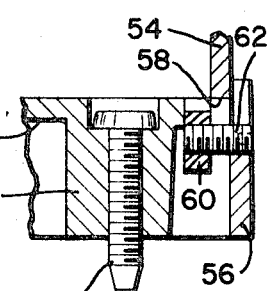

PNEUMATIC THERMOSTAT

This invention relates to an improved bimetallically controlled pneumatic thermostat particularly adaptable for use in forced air conditioning and heating systems for buildings.

In a typical pneumatically controlled air conditioning system the amount of air flowing in the main supply duct to a room is controlled by a duct valve operated by an air actuator. The actuator is supplied by air that flows through a restricted orifice from a constant pressure source and a thermostat is connected to a branching line from the orifice. The thermostat has a variable orifice that allows an amount of air from the pressure source to bleed off or escape and the precise rate of escaping air at the thermostat orifice is controlled by a bimetal valve which responds to ambient temperature variations. This rate of escaping air at the thermostat affects the amount of air supplied to the actuator, thereby controlling the duct valve and consequently the flow of air to the room.

In large buildings the air heating and conditioning system may utilize large numbers of pneumatic thermostats. If these thermostats are not properly calibrated they will not operate efficiently to control the room temperature at the desired setpoint temperature, thereby causing the room temperature to become excessively hot or cold and causing discomfort to occupants.

Pneumatic thermostats are normally designed, made and then calibrated at the factory to operate properly within a certain limited temperature range. However, due to their relatively delicate nature and the close tolerances required for proper operation they may come out of adjustment. This often occurs due to rough handling during shipping or during the original installation. It then becomes necessary to recalibrate the thermostat in order for it to accurately control the room temperature at a preselected set point. With thermostats heretofore devised this checking and calibration process was a complicated, time consuming procedure requiring at least one semi-skilled technician and special tools and entailing at least a partial disassembly of the thermostat.

Accordingly, one object of the present invention is to solve the aforesaid problem by providing an improved thermostat whose operating condition can be checked and whose internal mechanism can be calibrated to change the operating condition, all without removing the thermostat cover.

Another object of the present invention is to provide a pneumatic thermostat which can be checked and calibrated for efficient operation with the control pressure available by reference to a visual indicator which is part of the thermostat mechanism and by means accessible through its cover.

Another object is to provide a thermostat that can be checked and adjusted or calibrated for proper operation rapidly and with sufficient accuracy by relatively unskilled labor and without the need for special tools or testing apparatus.

Another object of the invention is to provide a thermostat that can be calibrated without opening its housing and which has an indicator which assumes one position when the set point equals the actual ambient temperature and which assumes different detectable positions which indicate when the unit is either calling for heating or calling for cooling.

Yet another object of my invention is to provide an improved pneumatic thermostat that is accurate, durable and reliable and yet particularly well adapted for ease and economy of manufacture.

The aforesaid and other objects are accomplished by a thermostat generally comprising a housing with a base member supporting an element having a port at the end of a passage adapted for connection to a control air line from an air pressure source. Positioned above the port is a flexible, temperature sensitive bimetal member that controls the amount of bleed air passing through it and thus the amount of air allowed to flow to a pneumatic actuator of the air conditioning system which operates a valve in the main air duct. The bimetal member is mounted on a pivotal arm that can be adjusted to vary the distance of the bimetal member from the port and thus the amount of air flow through it. On the underside of the base member is a chamber that receives air tapped from the passage leading to the air port. Within this chamber is a diaphragm surrounding the rear end of an indicator pin. This pin is biased to a retracted position by a spring having a predetermined force. In addition to this pin spring, the other thermostat elements such as the bimetal and its distance from the air port as controlled by pivotal arm, and the size of the air port are made so that in a properly calibrated thermostat when the pivotal arm is positioned at the set point, such as normal room temperature, the head of the indicator pin will be flush with a face plate within the thermostat housing. If the pressure within the chamber at this same set point exceeds the spring force on the indicator pin, the latter will move axially to a position beyond the face plate that makes it visible from outside the thermostat. This will occur when the unit is calling for cooling and will enable one to ascertain immediately that an adjustment is required. Similarly, if the indicator pin is fully retracted so as to become less visible it will be apparent that the unit is calling for heat. An adjustment means near one end of the arm is accessible from outside of the thermostat and enables the arm to be moved so that the bimetal member is positioned either closer to or farther from the air port. By moving the set point indicator the thermostat can be readily checked at the existing temperature as well as high and low points by observing the action of the indicator pin.

Other objects, advantages and features of the present invention will become apparent from the following detailed description taken in conjunction with the drawing, in which:

FIG. 1 is a schematic diagram of a pneumatic control system including an enlarged front view in elevation of a thermostat embodying the principles of the present invention;

FIG. 2 is a view in section of my thermostat taken along line 2—2 of FIG. 1;

FIG. 3 is a plan view of my thermostat with the cover removed and shown in phantom;

FIG. 4 is a view in section taken along line 4—4 of FIG. 3;

FIG. 5 is a view in section taken along line 5—5 of FIG. 3; and

FIG. 6 is a fragmentary view in section taken at line 6—6 of FIG. 3.

Referring to the drawing, FIG. 1 shows a pneumatic thermostat 10 embodying the principles of my invention as it appears when mounted in the usual manner on a wall of a room whose temperature is being controlled. As one component of a typical air conditioning and heating system for a building, shown schematically, the thermostat is connected by a pneumatic line 12 to a conduit 14 from an air pressure source 16 which also supplies air to a pneumatic control actuator 18 connected to a valve 20 in an air conditioning duct 22. The conduit 14 has a restrictor or orifice 23 with a small diameter (e.g. 0.007 inches) that limits the air flow to both the actuator and the thermostat. The purpose of the thermostat is to bleed air from the air pressure conduit at a rate that will control the actuator and hence the position of the duct valve 20, thereby causing the proper amount of air to flow through the duct and maintain the desired room temperature. In the thermostat this is accomplished by varying the size of a bleed air orifice.

From the front, the thermostat 10 has an upper window 24 through which a present temperature needle 26 is visible above a graduated scale. In a lower window 28 is a transverse bar 30 in front of a marked scale for indicating the set point for the thermostat. Centrally located in the upper window is a visible opening 32 through which a pop-out indicator 34 may become visible during the operation of the thermostat to indicate a calibration status as will be explained later. At one end of the lower window is another small opening 36 through which an adjusting means in the form of a set screw 38 is accessible. The transverse bar or set point indicator 30 is part of a rotatable cam member 40 and thus appear to move horizontally along its adjacent scale by means of the knurled edge portion of the cam member 40 located at the bottom of the thermostat.

Turning now to FIGS. 2 - 6, thermostat 10 as shown in greater detail comprises a base member 42 having a generally rectangular shape which is preferably molded from a suitable rigid plastic such as acrylonitrile butadiene styrene. This base member has a main transverse portion 44 bordered by downwardly extending side walls 46 around its periphery and also a central integral rib portion 48 that extends transversely between side portions to provide added strength and rigidity. A cover member 50 which may be molded from the same type of plastic material has an upper transverse face portion 52 with openings for the windows 24 and 28 and side portions 54 that extend downwardly from its periphery.

These side portions are connected to lower side portions 56 that form a shoulder 58 and fit adjacent to the side walls 46 of the base member. As shown in FIG. 6, at opposite sides of the thermostat the shoulder 58 bears against the edge of the base member which supports a nut 60. A set screw 62 is threaded into this nut and extends through the lower side portion of the cover so as to be accessible from outside of it. In this way the cover member 50 is secured firmly to the base member 42 but it can be quickly removed when necessary.

The basic operating mechanism of the thermostat as shown in FIGS. 3 - 5 comprises an arm 64 having a channel shaped cross-section that is connected at one end by a flexible, thin metal hinge 66 to a mounting screw 68. The latter is preferably a self tapping screw that is seated in a boss 70 formed in the base member. The hinge is secured to the arm by a pair of rovets 72.

At its other end the arm 64 extends around an upright integral post 74 on the base member 42 and is biased downwardly toward it by a coiled spring 76. This spring, located around the post is held in place by a washer-like retainer 78 that frictionally grips the upper end of the post. Spaced a short distance from this retainer is a nut 80 that is fixed to the arm 64, and threadedly engaged in this nut is the set screw 38 which extends inwardly toward the base member. The inner end of the set screw bears against an arcuate cam surface 82 of the movable cam member 40 having the knurled edge portion. This cam member is rotatably mounted on a screw 84 of the self-tapping type which is secured in a centrally located boss 86 on the base member (See FIG. 2). The head of this screw is located within a centrally located recess 88 on the cam member 40 and bears against a spring washer 90 which surrounds an opening for the screw within the recess. The arcuate cam surface 82 slopes gradually with respect to a plane perpendicular to the axis of rotation of the cam member and along a constant radius from this axis, so that when the cam is rotated about the central screw 84 the set screw 38 rides up or down on the cam surface and causes the arm 64 to pivot slightly about its hinge 66.

Between the ends of the arm 64 is an opening 92 and fixed near one edge of this opening by a pair of rovets 94 is one end a bi-metal member strip 96 of the type commonly used in thermostats. The free end of this bi-metal strip extends outwardly into the opening in the arm and also over an air bleed orifice 98. As shown best in FIGS. 4 and 5, this orifice is formed by a tubular member 100 having a threaded upper end portion that extends above the upper surface of the base member and is retained by a nut 102. A lower portion of this tubular member has an enlarged axial chamber 104 that communicates with the orifice 98 and terminates at an opening below the base member which is surrounded by a lip 106. This lip enables the member 100 to be readily connected to the air line 12 of the control apparatus. Between the upper and lower end portions of this tubular member is an integral flange portion 108 that bears against the bottom of a calibration housing 110. An annular recess in this housing surrounds the tubular orifice member and provides a seat for a sealing O-ring 112.

The housing 110 which may be formed from a rigid molded plastic material has a main generally rectangular portion that extends below the base member 42 to one side of the tubular member and has integral side wall portions 114 with flat edge surfaces around its periphery. A diaphragm 116 of flexible sheet material such as rubber or neoprene having the same shape as the housing is provided between the housing 110 and the underside of the base member. When the nut 102 at the upper end of the tubular member is taken up against the base member, the flange 108 of the tubular member bears against and forces the calibration housing 110 up against its underside so that the flat edges of the housing press against the diaphragm and form an air tight chamber 118 within the housing sidewall portions 114. A small branching orifice 120 is provided in the side of the enlarged axial chamber 104 of the tubular member so that air passing through it is also allowed to fill the chamber 118 of the calibration housing 110.

Now, in the base member near one end of this housing is a conical opening 122 to a cylindrical recess 124 formed by a boss 126 that extends above the base member 42. In a passage extending through the end of this boss and aligned with the recess is the indicator 34 which is a slidable pin preferably having a brightly colored outer end. The inner end of this pin has an enlarged head 128 which retains a coiled spring 130 between it and the inner end of the recess 124. The diaphragm 116 is bonded to the base member up to the edge of the countersunk opening 122 which is substantially larger than the head of the indicator pin. Thus, the pin is fully covered by the diaphragm and it is seen that the air pressure within the chamber will act on the diaphragm around the pin to force it against the spring 130. The spring is selected with a predetermined force factor that will allow movement of the indicator pin only when the air pressure in the calibration chamber reaches a certain predetermined level.

Mounted within the thermostat cover is a face member 132 having the suitable indicia for a thermometer scale and the opening 32 which is aligned with the end of the indicator pin 34. This face member may be mounted within the cover by thermal upset means on four bosses 134 spaced apart on its upper side walls. The face member also provides a mounting means for a suitable thermometer unit 136 which may be the conventional spiral type mounted within a hub-like housing 138 fixed to the face member. The thermometer needle 26 fixed to a shaft of the hub unit extends upwardly to be visible in the upper window 24 and is lated with reference to the graduation scale on the face member.

In a typical installation of my thermostat 10 the base member 42 is secured to wall structure by means of mounting screws 140 that are supported in boss members 142 of the base member, as shown in FIG. 6. After an air line 12 from the air pressure source 16 is connected to the inner end of the tubular member 100, air from this line passes through its end orifice 98 and against the bimetal strip 96. By moving the knurled edge portion of the thermostat cam 40 the arm 64 is pivoted about its hinged end and thus the bimetal is moved either farther away from or closer to the orifice, thereby allowing more or less air to flow through it. Moving the cam member, also moves the diagonal bar 30 which is actually the upper surface of an upright portion 144 on the cam. At the proper cam setting just enough air will flow through the orifice 98 to allow the actuator 18 (as shown in FIG. 1) to maintain the duct valve 20 of the system at a position that will maintain the desired temperature. If an external temperature change occurs, the bimetal strip 96 will also react without movement of the arm 64 to move either closer to or farther away from the orifice to vary the bleed air flow rate. This will also cause the actuator to react and thereby compensate for the external temperature change. If, for some reason the air pressure available to the thermostat was below normal, the position of the thermostat arm itself would have to be adjusted in order to achieve efficient operation and prevent an excessive release of air through the orifice. Also, when the proper amount of air is flowing through the orifice 98, the bimetal member 96 can flex due to ambient temperature variations within a desired range and thereby effectively provide the change in air flow necessary to operate the actuator and compensate for the temperature variations.

The calibration of my thermostat 10 according to the present invention can be performed quickly and easily by the following procedure. The cam 40 is first moved by means of its knurled edge portion so that the set point indicator bar 30 is at the same temperature as indicated by the temperature needle 26. The thermostat elements are sized and constructed so that with the temperature reading at a standard room level (e.g. 68°) and the set point indicator bar also at the same level, the outer red end 34 of the indicator pin will become flush with the face member 132 within the opening 32, if the thermostat is properly calibrated. Now, if the end of the indicator pin does not appear after a period of 60 seconds, this is an indication that excessive air is escaping from the thermostat orifice 98. At this point, the serviceman merely utilizes a small wrench which is inserted through the cover opening 36 in the lower indicator panel to engage the set screw 38. The wrench and thus the set screw are turned one quarter turn at a time, and after each turn a 60 second period is allowed to elapse to give the pin a chance to move to its equilibrium position. Using a set screw with standard threads, a turn to the right or clockwise will move the arm 64 farther away from the cam surface 82 and thereby also move the bimetal farther away from the orifice 98 to allow more bleed air to flow. A relatively small movement of the bimetal from the orifice will considerably vary the air flow rate through the orifice 98 and thereby reduce the air pressure in the calibration chamber 118 to cause the indicator pin to retract or move inwardly within the thermostat. A counterclockwise movement of the set screw will produce an opposite movement of the indicator pin, that is outwardly. Again, when the head of the indicator pin is substantially flush with the face panel 132 the thermostat is properly calibrated and will provide efficient and accurate control of the ambient room temperature.

From the foregoing it is seen that the present invention provides an improved thermostat that is relatively simple in construction and yet highly versatile and easy to calibrate. In buildings where large numbers of thermostats are required for complicated heating and air conditioning systems, my thermostat can be installed quickly and then can be properly calibrated without removing it from its installed position or removing its cover and without using special tools or gages. In its construction, the thermostat is comprised of a relatively small number of elements which can be made economically in large quantities and assembled with relative ease.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A thermostat for use in controlling an air conditioning system including a pneumatic actuator connected to a flow valve in an air duct, said thermostat comprising:
    a housing assembly including a base member;
    means on said base member having a bleed orifice at one end connected by a passage to an inlet at its other end adapted to be connected to an air pressure source that also supplies air to the actuator;
    an arm pivotally connected to said base member;
    and a temperature sensitive bimetal strip connected to said arm extending over said orifice;

cam means mounted on said base member and having a sloping cam surface and including means forming a set point indicator and adjusting means accessible from outside said housing for moving said set point indicator to a preselected position;

adjusting means for controlling the distance of said arm relative to said cam surface and thereby controlling the distance of said bimetal strip from said orifice and consequently the rate of air flow through it;

a calibration indicator means;

and means responsive to the positioning of said arm by said adjusting means for causing said indicator means to provide a visible indication that said arm is properly positioned commensurate with the air pressure being supplied to the thermostat.

2. The thermostat as described in claim 1 wherein said adjusting means comprises spring means for urging said arm toward said cam means on said base member and an adjustable set screw mounted in said arm at a distance from its pivoting end and engaging said cam surface.

3. The thermostat as described in claim 2 wherein said indicator meenas includes an axially movable pin mounted in said base means and a face member in said housing having an opening aligned with said pin, said pin having a length sufficient to cause one of its ends to extend through said opening in response to the restriction of air flowing through said orifice.

4. The thermostat as described in claim 3 wherein said indicator means further includes means forming a calibration chamber communicating with said passage to said bleed orifice, and diaphragm means within said chamber engaging one end of said pin.

5. The thermostat as described in claim 3 wherein said cam means has an exposed edge portion to facilitate its manipulation for moving said set point indicator, a first scale means on said face member adjacent said set point indicator and thermometer means having a second scale means attached to said face member.

6. The thermostat as described in claim 1 wherein said set point indicator comprises an integral upwardly extending portion of said cam means spaced from its central axis of rotation and having a bar shaped upper end portion to extend transversely in a window of said housing.

7. A thermostat for use in controlling an air conditioning system including a pneumatic actuator connected to a flow valve in an air duct, said thermostat comprising:

a housing having a front cover portion with window means and a base member within said housing;

means fixed to said base member having a bleed orifice at one end and connected by an internal passage to an inlet at its other end adapted to be connected to an air pressure source that also supplies air to the actuator;

an arm pivotally connected to said base member;

and a temperature sensitive bimetal strip connected to said arm extending over said orifice;

a rotatable cam means mounted on said base member and having an arcuate sloping cam surface and including means forming a set point indicator and adjusting means accessible from outside said housing for moving said set point indicator to a preselected position;

an adjusting means for controlling the distance of said arm relative to said cam surface and thereby controlling the distance of said bimetal strip from said orifice and consequently the rate of air flow through it;

a movable calibration indicator means, and control means responsive to the positioning of said arm by said adjusting means and thus the rate of air flow through said bleed orifice for causing said indicator means to become visible through said window means to thereby indicate whether said arm is properly positioned commensurate with the air pressure being supplied to the thermostat.

8. The thermostat as described in claim 7 wherein said calibration indicator means comprises a pin member supported in said base member, spring means for biasing said pin member toward a retracted position, a face member supported within said housing and spaced from said window means, said face member having an opening aligned with said indicator means and visible through said window means, said control means being operable to oppose said spring means and move said pin member to an extended position through said face member under certain flow conditions through said bleed orifice.

9. The thermostat as described in claim 8 wherein said control means comprises a disk-like member forming a sealed chamber under said base member which receives air from said internal passage of said means having a bleed orifice, diaphragm means forming one wall portion of said chamber and engaged with said pin member, whereby increased pressure within said chamber due to decreased flow through said bleed orifice causes said diaphragm to move said pin member.

10. The thermostat as described in claim 9 wherein said means having a bleed orifice is generally cylindrical and has a flange portion which bears against and retains said disk-like member on said base member.

11. The thermostat as described in claim 9 wherein said spring means has a force factor which will hold the outer end of said pin member generally flush with said face member when the thermostat is properly calibrated.

12. The thermostat as described in claim 9 wherein said window means comprises upper and lower glass windows, said upper window being adjacent a thermometer needle and a scale mounted on said face member and also said opening for said indicator pin member, said lower window being adjacent said set point indicator.

13. The thermostat as described in claim 9 wherein said lower window includes an opening to provide access for said adjusting means.

14. The thermostat as described in claim 13 wherein said adjusting means comprises means for urging said arm toward said cam means on said base member and an adjustable set screw mounted in said arm at a distance from its pivoting end and engaging said cam surface.

* * * * *